United States Patent
McLeod et al.

(10) Patent No.: US 7,278,528 B2
(45) Date of Patent: Oct. 9, 2007

(54) METHOD OF AND APPARATUS FOR APPLYING A FILM OPTIONALLY INCLUDING ADVERTISING OR OTHER VISIBLE MATERIAL, TO THE SURFACE OF A HANDRAIL FOR AN ESCALATOR OR MOVING WALKWAY

(75) Inventors: John McLeod, Toronto (CA); Viqar Haider, Markham (CA); Ion-Viorel Tatu, Mississauga (CA)

(73) Assignee: Ronald H. Ball, Cameron (CA)

( * ) Notice: Subject to any disclaimer, the term of this patent is extended or adjusted under 35 U.S.C. 154(b) by 78 days.

(21) Appl. No.: 11/030,071

(22) Filed: Jan. 7, 2005

(65) Prior Publication Data

US 2005/0118400 A1 Jun. 2, 2005

Related U.S. Application Data

(60) Continuation-in-part of application No. 10/752,316, filed on Jan. 7, 2004, which is a continuation-in-part of application No. 09/252,784, filed on Feb. 19, 1999, now Pat. No. 6,682,806, and a continuation-in-part of application No. 10/126,514, filed on Apr. 22, 2002, now Pat. No. 7,108,905, which is a division of application No. 09/510,498, filed on Feb. 22, 2000, now Pat. No. 6,450,228, which is a continuation-in-part of application No. 09/252,784, filed on Feb. 19, 1999, now Pat. No. 6,682,806, and a continuation-in-part of application No. 10/126,518, filed on Apr. 22, 2002, now Pat. No. 7,041,195, which is a division of application No. 09/510,498, filed on Feb. 22, 2000, now Pat. No. 6,450,228, which is a continuation-in-part of application No. 09/252,784, filed on Feb. 19, 1999, now Pat. No. 6,682,806.

(51) Int. Cl.
*B66B 23/22* (2006.01)

(52) U.S. Cl. .............. 198/337; 198/501.1; 156/356
(58) Field of Classification Search .............. 198/501.1, 198/337, 321; 40/524; 156/356, 495, 448, 156/496
See application file for complete search history.

(56) References Cited

U.S. PATENT DOCUMENTS 3,055,498 A 9/1962 Dunlap (Continued)

FOREIGN PATENT DOCUMENTS

CA 1304035 6/1992

(Continued)

*Primary Examiner*—James R. Bidwell
(74) *Attorney, Agent, or Firm*—Bereskin & Parr

(57) ABSTRACT

A film and a method of applying the film to a handrail of an escalator or moving walkway are provided. The film can be a single or double layered film. Printed matter, e.g. advertising, can be applied to or between the films. An apparatus and related method for applying the film are also included and rely on the motion of the handrail to unroll a supply of the film, with one or more rollers pressing the film onto the handrail. The film is stretched during application to pre-stretch and reduce tendency for compressive strains in use to cause wrinkling of the film and detachment from the handrail. To retain the ends of the film in relative position, a film cap is fused or bonded to end portions of the film.

23 Claims, 11 Drawing Sheets

U.S. PATENT DOCUMENTS

| | | | |
|---|---|---|---|
| 4,771,305 | A | 9/1988 | Potoroka |
| 5,020,256 | A | 6/1991 | French |
| 5,048,823 | A | 9/1991 | Bean |
| 5,160,009 | A | 11/1992 | Iyoda et al. |
| 5,275,270 | A * | 1/1994 | Dobo .................. 198/337 |
| 5,354,397 | A | 10/1994 | Miyake et al. |
| 5,370,265 | A | 12/1994 | Mackay et al. |
| 5,403,636 | A | 4/1995 | Crum |
| 5,587,218 | A | 12/1996 | Betz |
| 5,743,064 | A | 4/1998 | Bennett |
| 5,894,048 | A | 4/1999 | Eckart et al. |
| 6,047,809 | A | 4/2000 | Idetsuki |
| 6,082,525 | A * | 7/2000 | Vonholm et al. ......... 198/502.1 |
| 6,450,228 | B1 | 9/2002 | McLeod et al. |
| 6,564,921 | B1 * | 5/2003 | Gorczyca .................. 198/324 |
| 2004/0103572 | A1 | 6/2004 | Naidu |

FOREIGN PATENT DOCUMENTS

| | | |
|---|---|---|
| DE | 2911446 U1 | 6/1998 |
| EP | 0 316 384 B1 | 1/1994 |
| FR | 2610751 | 8/1988 |
| FR | 2728377 | 6/1998 |
| GB | 1163112 | 9/1969 |
| GB | 2293478 | 3/1996 |
| IT | 66056 | 2/1994 |
| JP | 48-87786 | 1/1972 |
| JP | 48-25687 | 3/1973 |
| JP | 55-131076 | 10/1980 |
| JP | 57-112369 | 7/1982 |
| JP | 57-130883 | 8/1982 |
| JP | 59-17480 | 1/1984 |
| JP | 60-178882 | 11/1985 |
| JP | 61-111264 | 5/1986 |
| JP | 62-33080 U | 2/1987 |
| JP | 62-35834 | 2/1987 |
| JP | 62-183344 | 8/1987 |
| JP | 62-157876 | 10/1987 |
| JP | 61-59274 | 3/1988 |
| JP | 2-500137 | 1/1990 |
| JP | 2-41932 | 2/1990 |
| JP | 02-286328 | 11/1990 |
| JP | 02-295856 | 12/1990 |
| JP | 3-18079 | 2/1991 |
| JP | 03-066887 | 3/1991 |
| JP | 03-106792 | 5/1991 |
| JP | 3-86383 | 11/1991 |
| JP | 03-272994 | 12/1991 |
| JP | 04-129962 | 4/1992 |
| JP | 5-46857 | 6/1993 |
| JP | 05-306087 | 11/1993 |
| JP | 6-168154 | 6/1994 |
| JP | 6-206684 | 7/1994 |
| JP | 7-101659 | 4/1995 |
| JP | 07101659 A | 4/1995 |
| JP | 7-125961 | 5/1995 |
| JP | 07-206352 | 8/1995 |
| JP | 07-311546 | 11/1995 |
| JP | 7-330271 | 12/1995 |
| JP | 08-199121 | 6/1996 |
| JP | 8-248883 | 9/1996 |
| JP | 08-310780 | 11/1996 |
| JP | 62-189147 | 8/1997 |
| JP | 10-59672 | 3/1998 |
| JP | 10-081478 | 3/1998 |
| JP | 10-147489 | 8/1998 |
| JP | 8-286614 | 11/1998 |
| JP | 10-305487 | 11/1998 |
| JP | 10-338454 | 12/1998 |
| JP | 11-005924 | 1/1999 |
| JP | 2000-021201 | 1/2000 |
| JP | 2000-502963 | 3/2000 |
| JP | 2000-103585 | 4/2000 |
| JP | 2001-302160 | 10/2001 |
| KR | 20-2003-0004603 | 2/2003 |
| KR | 2003-0039758 | 5/2003 |
| KR | 10-0406755 | 11/2003 |
| KR | 10-2004-0074199 | 8/2004 |
| WO | WO 2004/067431 A1 | 8/2004 |

* cited by examiner

METHOD OF AND APPARATUS FOR APPLYING A FILM OPTIONALLY INCLUDING ADVERTISING OR OTHER VISIBLE MATERIAL, TO THE SURFACE OF A HANDRAIL FOR AN ESCALATOR OR MOVING WALKWAY

CROSS REFERENCE TO RELATED APPLICATION

This application is a continuation-in-part of earlier application Ser. No. 10/752,316 filed Jan. 7, 2004, which is a Continuation-in-Part of application Ser. No. 09/252,784 filed Feb. 19, 1999, now U.S. Pat. No. 6,682,806 and is also a continuation-in-part of earlier application Ser. Nos. 10/126,514 now U.S. Pat. Ser. No. 7,108,905 and 10/126,518, now U.S. Pat. No. 7,041,195 filed Apr. 22, 2002, both of which are divisional applications of application Ser. No. 09/510,498 filed Feb. 22, 2000, this application also being a continuation of application Ser. Nos. 09/252,784. Application Ser. Nos. 09/252,784 and 09/510,498 are now U.S. Pat. Ser. Nos. 6,682,806 and 6,450,228.

FIELD OF THE INVENTION

This invention relates to handrails for escalators and moving walkways, and more particularly is concerned with applying a protective film, optionally including advertising or other visible material, to the surface of such a handrail.

BACKGROUND OF THE INVENTION

Advertisers continually seek out new locations to place advertisements. It has been recognized for sometime that various forms of mass transit and the like offer good opportunities for advertising. Necessarily, mass transit systems offer a large potential audience, and a relatively small number of well positioned advertisements can be seen by a large number of people. Traveling on mass transit is usually fairly time-consuming and hence travelers of such systems often have plenty of time to view and read advertisements, which also make such advertising attractive to businesses. This has been well recognized in the past, and advertisers have sought various locations for placing advertisements.

Escalators and moving walkways are a common component of many mass transit systems, and are also found in numerous other locations with a high level of pedestrian traffic, e.g. large office buildings, shopping malls, large stores and the like. While traveling on an escalator is relatively quick compared to, say, a subway journey, an escalator ride nonetheless presents a potential audience for advertisers. While a ride on an escalator is relatively short, it is certainly long enough for a rider to notice and read an advertisement. Moreover, it is not really practical for an escalator rider to do anything else while riding the escalator, such as read a book or newspaper.

Advertisers have long recognized this, and it is common on well-used escalators to find various advertising panels. Thus, conventional poster advertising is often found lining the walls of escalator shafts. Additionally, advertisers have sought to place smaller, poster-like advertisements on smaller panels on top of the strip separating balustrades of up and down escalators. Commonly, advertisements would be placed on both sides, so as to present advertisements to riders on both the up and down escalators.

Ingenious advertisers have sought other ways of advertising on escalators. Thus, it has occurred to others that advertising could be placed on escalator handrails. This is attractive, since an escalator handrail presents an otherwise unused surface. As for grasping any object, a rider on an escalator will instinctively first look at the handrail to locate it. This ensures that the handrail, more often than not, will be at least glanced at by each user or rider. This makes it attractive for simple advertising, e.g. well known company logos and other advertising devices.

SUMMARY OF THE INVENTION

The invention is based on the concept of providing a film to the surface of the handrail, which film is both continuous and is removable.

In earlier application Ser. No. 09/252,784 and U.S. Pat. No. 6,450,228 issued from a Continuation-in-Part of that Application, a flexible film with an adhesive layer was applied to a handrail, without any prestretching or tension. When a handrail, e.g. at the ends of an escalator or moving walkway, goes around a pulley, the handrail flexes, and in known manner the top portion of the handrail is stretched while the bottom portion is compressed. Indeed, the presence of steel cables or stretch inhibitors serve to define a neutral axis which is located in the top portion of the handrail. Consequently, part of the top of the handrail, above the steel cables is stretched or put in tension and the lower part of the top of the handrail and the lips are compressed. As the lips extend substantially below the neutral axis, they are subject to significant compression, as the handrail passes around end pulleys etc.

When a film is applied to the handrail, this means that edges of the film, located on the lips, are similarly compressed. In practice, this leads to wrinkling or puckering of the edges of the film. The adhesive used is unable to maintain adhesion of the extreme edges of the film to the handrail when it is subjected to the compression loading that results from flexing of the handrail.

In accordance with a first aspect of the present invention, there is provided, in combination, an elongate handrail and a flexible film adhered to the handrail, the film comprising: a first film layer and a first layer of adhesive between the first film layer and the handrail, bonding the first film layer to the handrail, wherein the film has been applied to the handrail in tension, whereby the film includes a desired prestretch, thereby to at least reduce any tendency for edges of the film to separate from the handrail when these edges are subject to compressive strains.

Another aspect of the present invention provides a method of applying a flexible film to a moving handrail, the method comprising:

(1) providing a film comprising a first film layer and first layer of adhesive on the underside thereof, the film being generally elongate and having width corresponding to the width of the handrail;

(2) aligning and adhering a first end of the film to a surface of the handrail;

(3) applying a substantially constant tension load to the film to provide a desired degree of strain to the film;

(4) driving the handrail relative to the film, to cause the prestretched film to adhere continuously and progressively to the handrail; and (5) ensuring that the full width of the film is uniformly and smoothly adhered to the surface of the handrail.

A further aspect of the present invention provides a method of forming a joint between two end portions of a film adhered as a continuous loop to the surface of a handrail, the method comprising:

(1) providing a film cap and adhering the film cap to surfaces of the end portions of the film; and (2) fusing or bonding the film cap to the end portions of the film to maintain the end portions in the film in alignment.

The present invention also provides an apparatus for applying an adhesive film to a moving handrail, the apparatus comprising: mounting means for mounting the apparatus to a balustrade; a first spindle means, for mounting a first roll of film; a tensioning device for applying tension to the film, to apply a desired amount of strain to the film before the film is applied to the handrail; and a pressure means for applying pressure to the film to cause the film to adhere to the handrail, whereby, in use, the handrail can be driven past the apparatus, causing the film to be unrolled from the first roll with the pressure means for causing the film to adhere to the handrail and the tensioning device prestretching the film.

In accordance with the present invention, there is provided a method of applying a flexible film to a moving handrail, with a desired degree of prestretch or elongation. Again, references to escalator handrails are to be understood to including handrails for moving sidewalks. The first step is to provide a flexible film comprising a first layer and a layer of adhesive on the underside thereof, wherein the film is generally elongate and having a width corresponding to the width of the handrail. The film is then aligned to the handrail and the first end of the film is adhered to the surface of the handrail. The handrail is then driven with respect to the film to cause the film to progressively and continuously adhere to the handrail. Simultaneously tension is applied to the film to pretension or prestretch the film.

BRIEF DESCRIPTION OF THE DRAWINGS

For a better understanding of the present invention and to show more clearly how it may be carried into effect, reference will now be made, by way of example, to the accompanying drawings which show the preferred embodiment of the present invention and in which.

DESCRIPTION OF THE INVENTION

Figure 1:
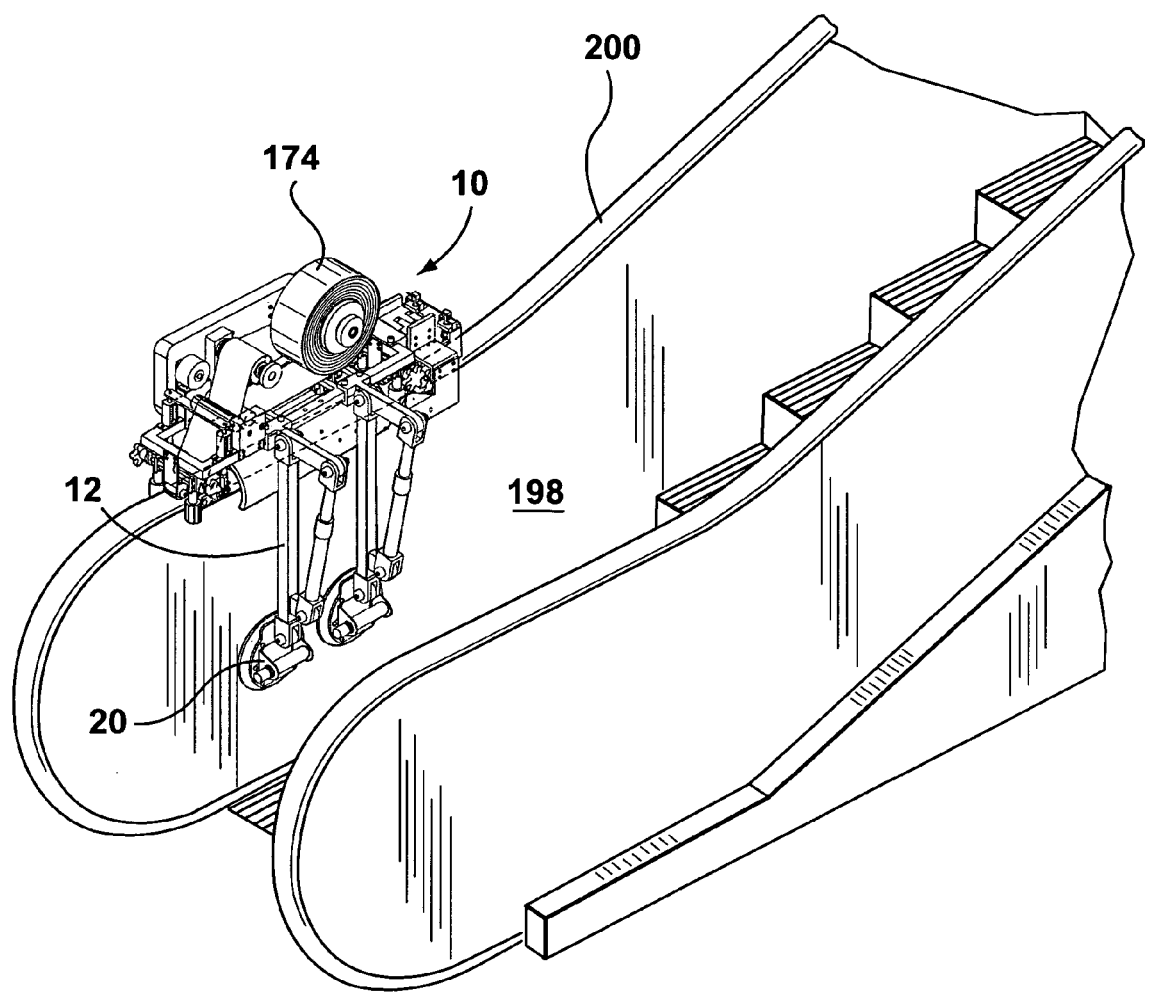
FIG. 1 is a perspective view showing an apparatus in accordance with the present invention in use on a balustrade of an escalator.
Figure 7:
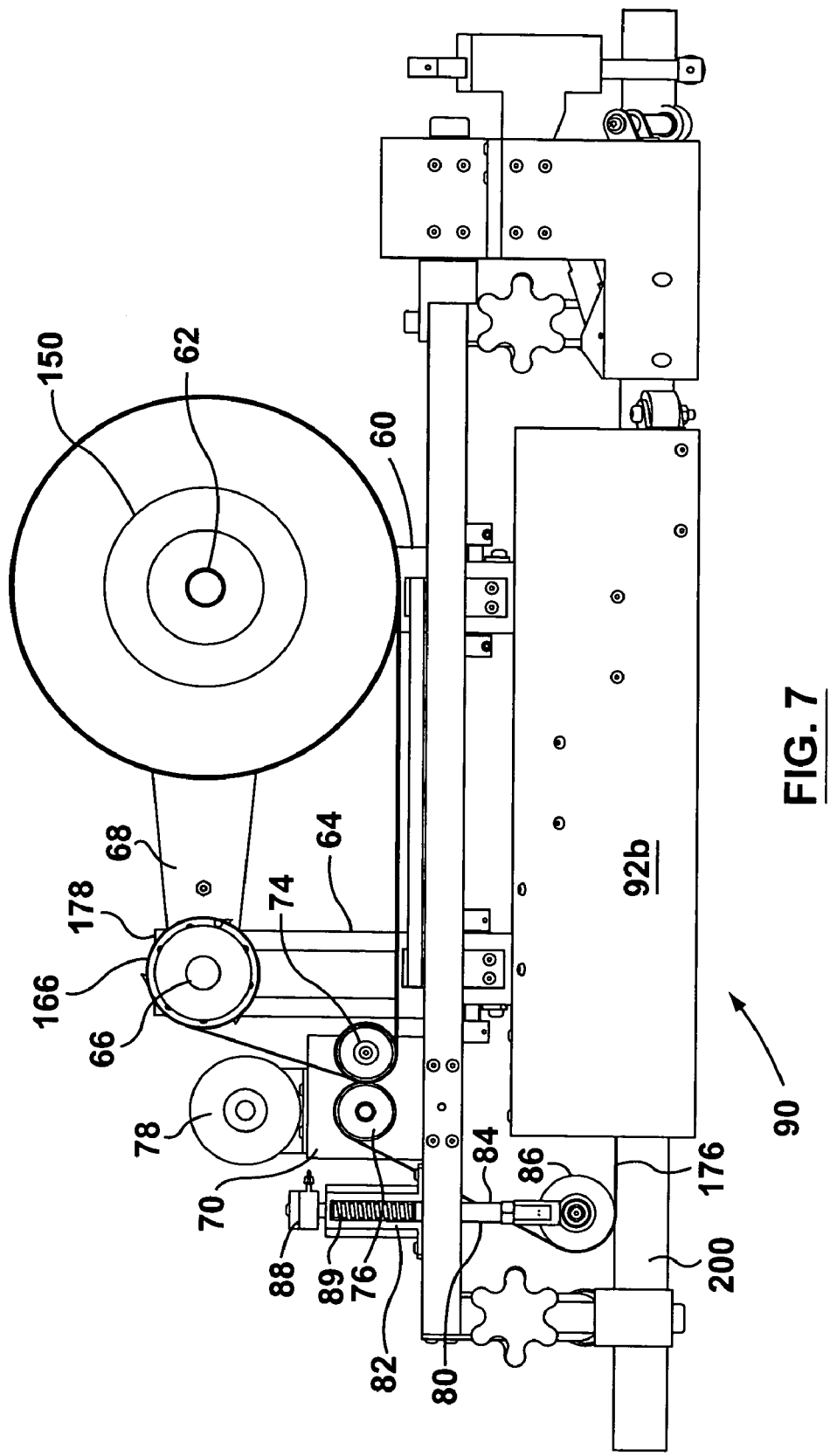
FIG. 7 is a side view of the apparatus, balustrade and handrail of FIGS. 1 and 2, showing operation of the apparatus.

FIGS. 1 and 7 show the basic configuration and mode of use of an apparatus for applying a film to a handrail, in accordance with the present invention, the basic principles of which are the same as the apparatus shown and as described in detail in U.S. Pat. No. 6,450,228, issued Sep. 17, 2002, the contents of which are hereby incorporated by reference.

The apparatus is indicated at 10 and is shown in FIG. 1 attached to a balustrade 198 of an escalator with the actual escalator handrail indicated at 200 as shown in detail in later figures. The apparatus 10 has first and second support arms 12 attached to suction cups 20, for attachment to the balustrade 198.

Each of the support arms 12 is a triangular structure including a main arm portion 14, extending generally vertically, an adjustable arm portion 16 and a top arm portion 18. The adjustable arm portion 16 include an adjustable threaded element, to enable the length of the arm portion 16 to be adjusted. The main arm portions 14 are pivotally mounted to the suction cups 20, and this arrangement accommodates different balustrade configurations and ensure that the working portion of the apparatus 10 is correctly located relative to the handrail. As indicated, the various arm portions 14, 16 and 18 are pivotally connected.

The ends of the top arm portions 18 include mounting brackets 22, for attachment to a main frame 30 of the apparatus 10. The main frame 30 includes a plurality of spaced apart holes or mounting locations 32, that enable the support arms 12 to be secured at different locations. Two sets or rows of the holes 32 are provided on the two sides of the frame 30, to enable it to be mounted on both sides of the frame 30, and thus to enable it to be mounted on both sides of an escalator or moving walkway, and to enable it to be mounted on either side of a particular balustrade. This again is intended to facilitate accommodation for different balustrade configurations 198 and the fact that many balustrades will not provide a continuous smooth surface for accepting the vacuum cups 20, so that the spacing and location of the arms 12 can be varied as desired. Preferably either the holes 32 or holes in the brackets 22 are threaded, for simple securing of the mounting brackets 22 with screws. The brackets 22 can be U-shaped with plain bores on one side and threaded bores on the other side, for clamping the brackets 22 to the frame 30.

Figure 4:
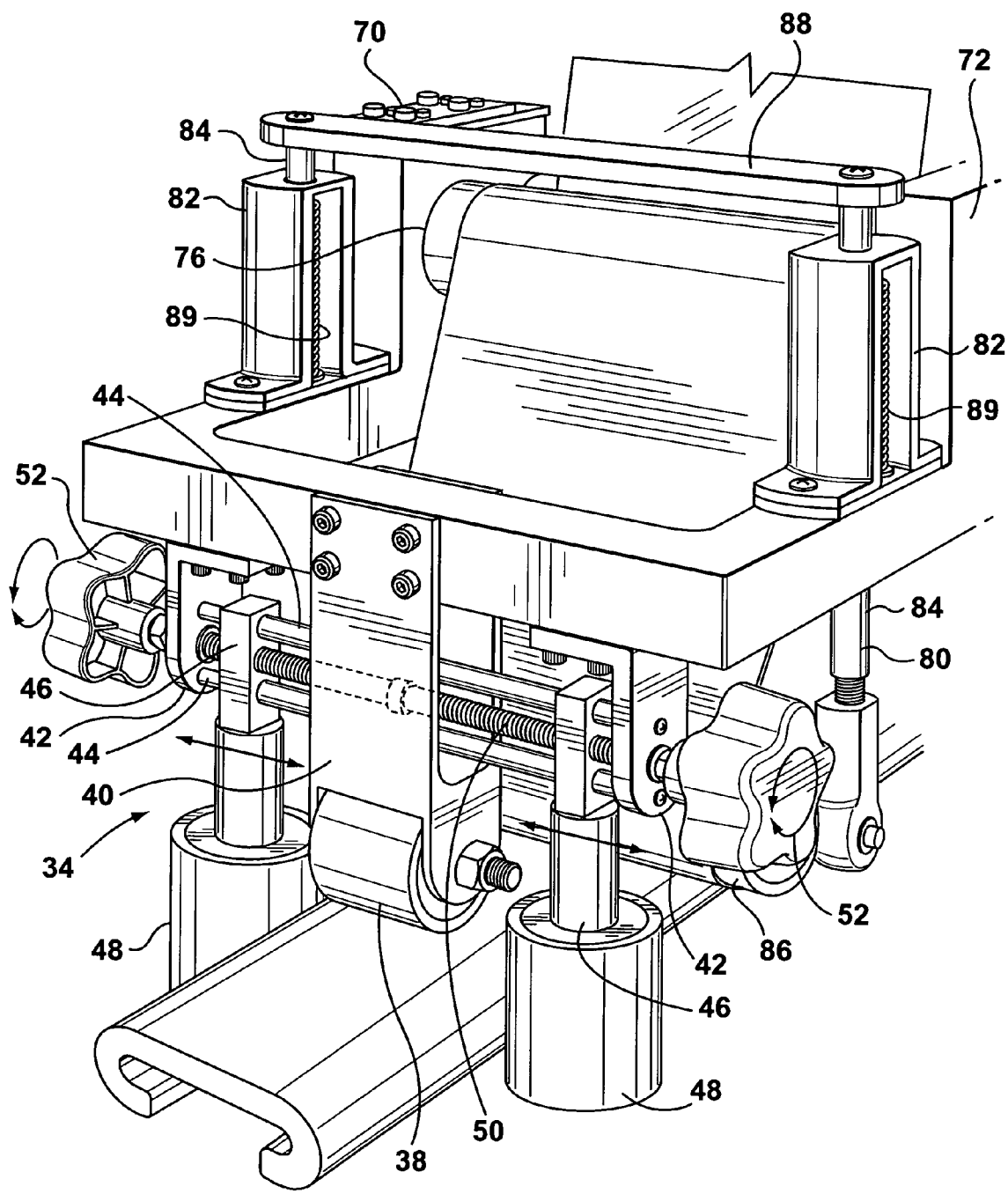
FIG. 4 is a perspective end view of a rearward end of the apparatus of the present invention.

The main frame 30 includes, at either end alignment roller devices 34 and 36. These roller devices 34, 36 generally correspond and for simplicity details of just the roller device 34 are described, these being shown in detail in FIG. 4.

Roller device 34 includes a central roller 38 mounted by a bracket 40 to the main frame 30. Side brackets 42 support transverse guide rods 44, on which are mounted support brackets 46 for side rollers 48.

A threaded shaft 50 with actuating knobs 52 at either end is rotatably mounted in the side brackets 42. The threaded shaft includes opposite threads for the two ends of the shaft which engage the support brackets 46. As a consequence, rotation of the knobs 52 will cause the two supports brackets 46 with their side rollers 48, either to move inwards towards one another or to move outwards away from one another.

A first spindle arm 60 (FIGS. 3 and 7) is provided extending upwardly from the main frame 30. A first spindle 62 is provided on the spindle arm 60, for mounting a roll of film for applying to a handrail.

A second, vertically extending arm 64 is provided, carrying a second spindle 66. In use, the spindle 66 is fitted with a roll for picking up a release sheet from the film.

A drive mechanism 68 for example a drive belt, which can be a toothed drive belt is provided connecting the spindles 62, 66, so that in use the spindle 66 for the take up roll is driven by the spindle 62. A gear ratio is provided between the spindles 62, 66, so that for all effective diameters of rolls on the two spindles 62, 66, the periphery of a roll on the take up spindle 66 is attempted to be driven at a higher speed. Then, a slip clutch is provided in the drive mechanism 68, to dissipate excess velocity applied to the spindle 66, whereby, effectively, at all times adequate tension is maintained in the release sheet as it is wound onto a roll on the spindle 66.

A pair of upwardly extending brackets 70, 72 are also provided on top of the main frame 30. A release sheet guide roller 74 (FIG. 7) is rotatably mounted between the brackets 70, 72, to guide a release sheet towards a roll on the spindle 66. A tension roller 76 is also mounted between the brackets 70, 72 for rotation, and is connected to a braking device or tension motor 78.

The braking device 78 can be a low profile electric motor that requires a conventional 110V A.C. input, and that provides a substantially constant torque, which in turn translates into a uniform tension applied to a film passing over the tension roller 76. However, it will be appreciated that any suitable active or passive device can be used, that provides an essentially constant torque over the range of film velocities encountered in practice. For example, a magnetic clutch has the advantage that it is passive and does not require an external power supply. As detailed below, the actual tension required can vary considerably and hence the braking device should be variable. For this purpose, to prevent slippage of the film, the film should wrap sufficiently around the tension roller 76 to ensure adequate drive characteristics between the roller 76 and the film.

A toothed drive belt can be provided connecting the braking device 78 to the tension roller 76. A common cover 114 can be provided for the toothed drive belt and also for the drive mechanism between the spindle shafts 62, 66.

Between the first roller device 34 and the tension roller 76, there is a pressure roller mechanism 80. The pressure roller mechanism 80 has a pair of upwardly extending guides 82. The pressure roller 76 has a shaft and is rotatably mounted to a pair of ball joints, that connect the shafts to the guides 82. This enables the guides 82 to move independently without binding or stressing the shaft of the roller 76.

Vertical shafts 84 are slideably mounted in the guides 82 and are connected to an axle of a pressure roller 86, whereby the pressure roller 86 is free to rotate around its axle. Upper ends of the shaft 84 are connected to a transverse member 88.

Springs 89 within the upwardly extending guides 82 are arranged to provide a downward force on the shafts 84, so as to press the pressure roller 86 downwardly towards the handrail, indicated at 200.

Now, generally in accordance with earlier application Ser. No. 09/252,784 and issued U.S. Pat. No. 6,450,228, a wrapping mechanism is provided for causing a film first adhered to a handrail by the action of the pressure roller 86, to be progressively wrapped around the handrail, so as to cover up substantially as much of the exposed surface of the handrail as desired. This wrapping mechanism is designated by the reference 90.

In the disclosed embodiment of the wrapping or pressing mechanism 90, it comprises two main components, namely a trough-shaped element 92 and a roller extension device 120, both including rollers. This separation into two components does provide some advantages, detailed below, but it will be understood that a single pressing mechanism, as in earlier U.S. Pat. No. 6,450,228, can be used and has the advantage of simplicity.

Figure 5:
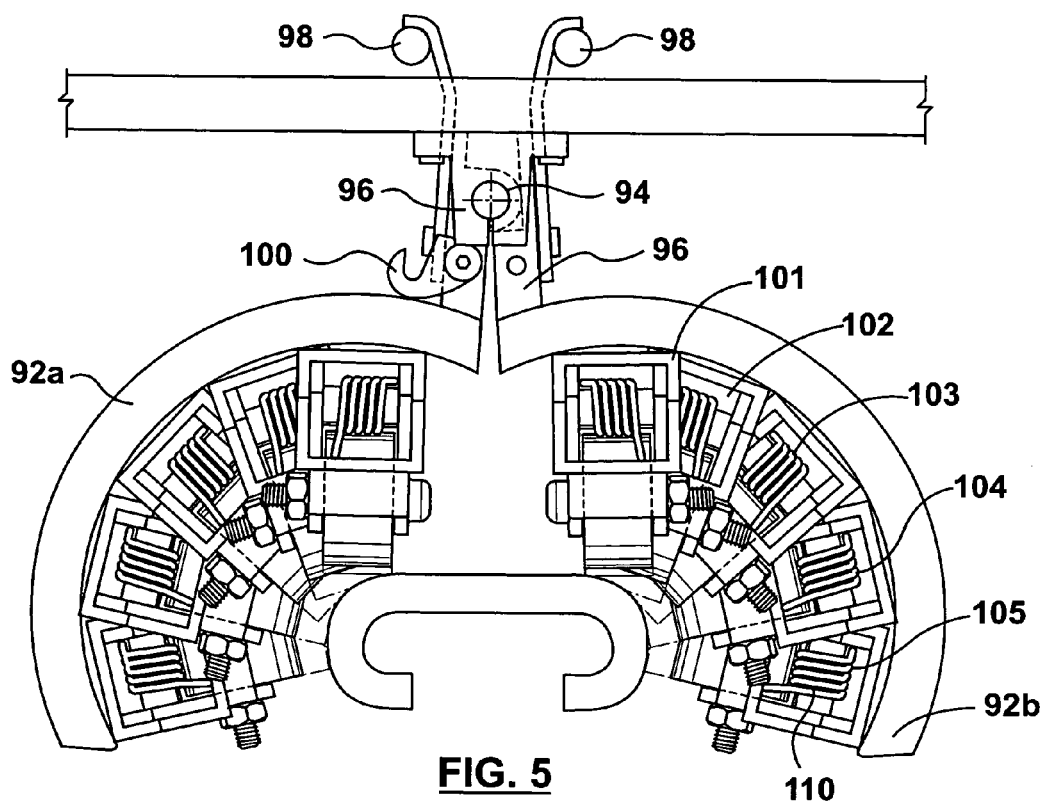
FIGS. 5 and 5a are view along an axis of the apparatus showing open and closed positions of a trough-shaped element of a pressing mechanism of the apparatus.
Figure 5A:
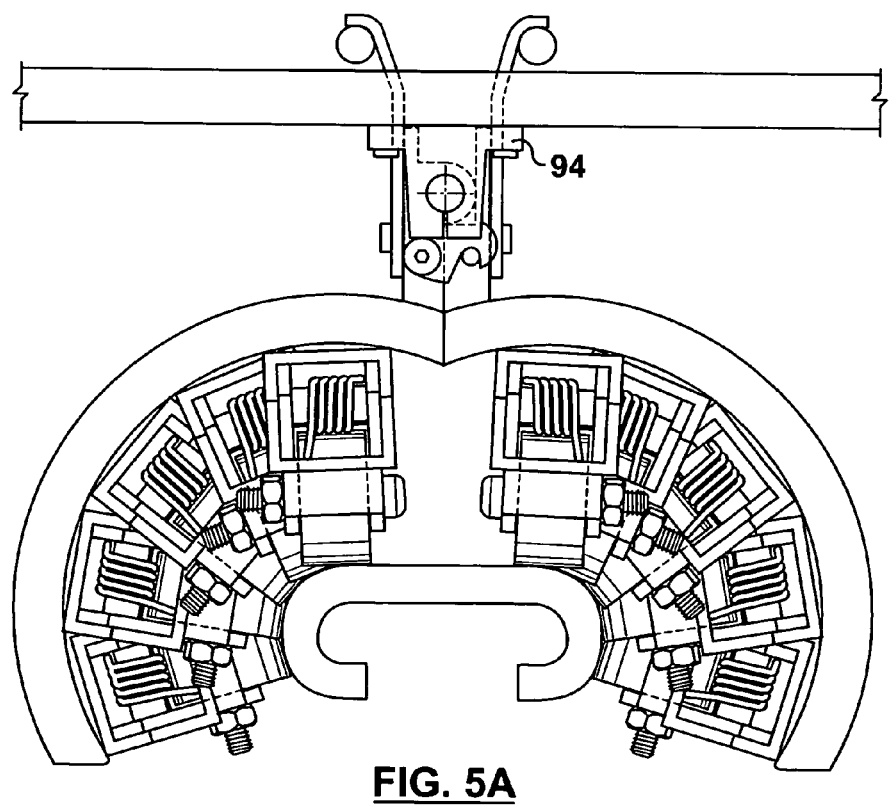

The wrapping or pressing mechanism 90 has a trough- or shell-shaped element 92 having first and second shell halves 92a, 92b. As shown in FIGS. 5 and 5a, extending downwardly from each of two cross members of the frame 30 are two brackets 94, to which the two shell halves 92a, 92b are pivotally mounted.

The two trough-shaped element halves 92a, 92b are at least partially transparent. In use, this transparency is sufficient to enable engagement of the roller with a handrail to be visually inspected, which facilitates mounting of the apparatus.

The two trough-shaped element halves 92a, 92b are pivotally mounted to a pair of brackets 94, attached to the main frame 30. Extension arms 96 extend upwardly from the elements 92a, 92b, and handles 98 are provided at their upper ends. Thus, by gripping and pressing the handles 98 together, the trough-shaped elements 92a, 92b are opened to the position shown in FIG. 5. To close the trough-shaped elements 92a, 92b, the handles 98 are released. A locking mechanism 100, comprising a simple catch, is provided at each bracket 94 for securing the elements 92a, 92b in the closed position, as shown in FIG. 5A. In the closed position, the rollers are pressed against the surfaces of the handrail 200 and a film on the handrail.

Figure 3:
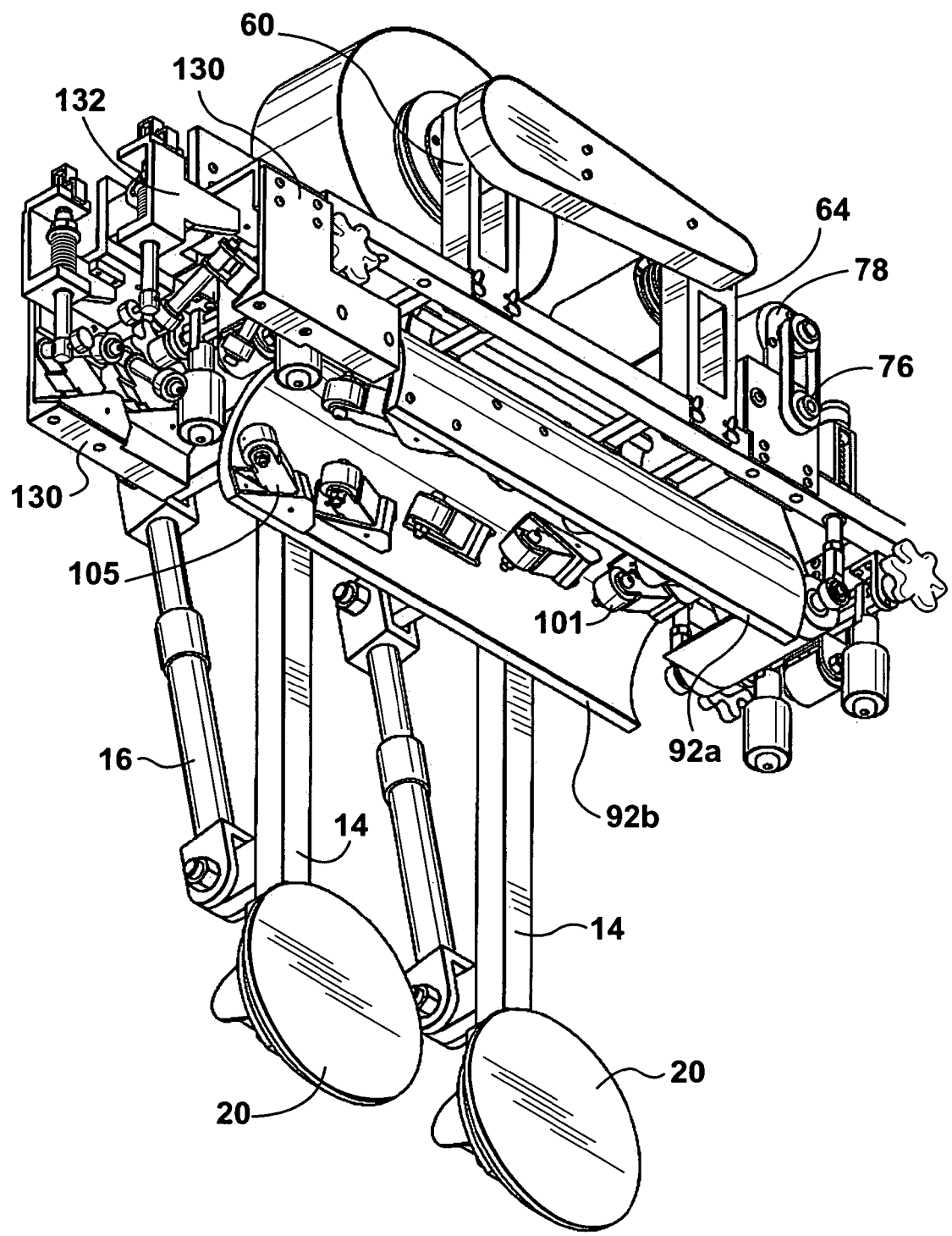
FIG. 3 is a perspective view from underneath of the apparatus of the present invention.

Referring in particular to FIGS. 3, 5 and 5a, a series of five pairs of rollers 101, 102, 103, 104 and 105 are rotatably mounted on roller mounting mechanisms inside each of the element halves 92a, 92b. Rollers 101-105 are mounted such that the rollers 101 are relatively close to the centre line of the apparatus and to the centre line of the handrail. Rollers 101 are mounted towards the rear of the element halves 92a and 92b. The other rollers 102-105 are located progressively further away from the centre line and progressively closer to the front of the mechanism, for progressively wrapping a film around the handrail. Each of the rollers 101-105 is mounted on a short arm and has a spring mechanism for pressing the roller against a handrail 200 and film 160.

A further three pairs of rollers 106, 107 and 108 can be mounted on a roller extension device 120, or lip roller assembly; as noted, it is not essential to provide these rollers 106-108 separately. It does facilitate separation of the apparatus 10 into components small enough to be easily packed and transported. Additionally, it simplifies the design of the trough-shaped element 92, since it then need only open a small amount; the rollers 108, in particular, require the lip roller assembly 120 to open further. Thus, compared to the earlier embodiment of the invention, there are now eight pairs of rollers, reflecting the intent to wrap the film entirely around the handrail, but it will be understood that various modifications, including the use of different numbers of rollers, are possible; for some applications fewer rollers may be adequate, while for unusual square handrail profiles, for example, it may be necessary to provide more rollers.

Figure 6:
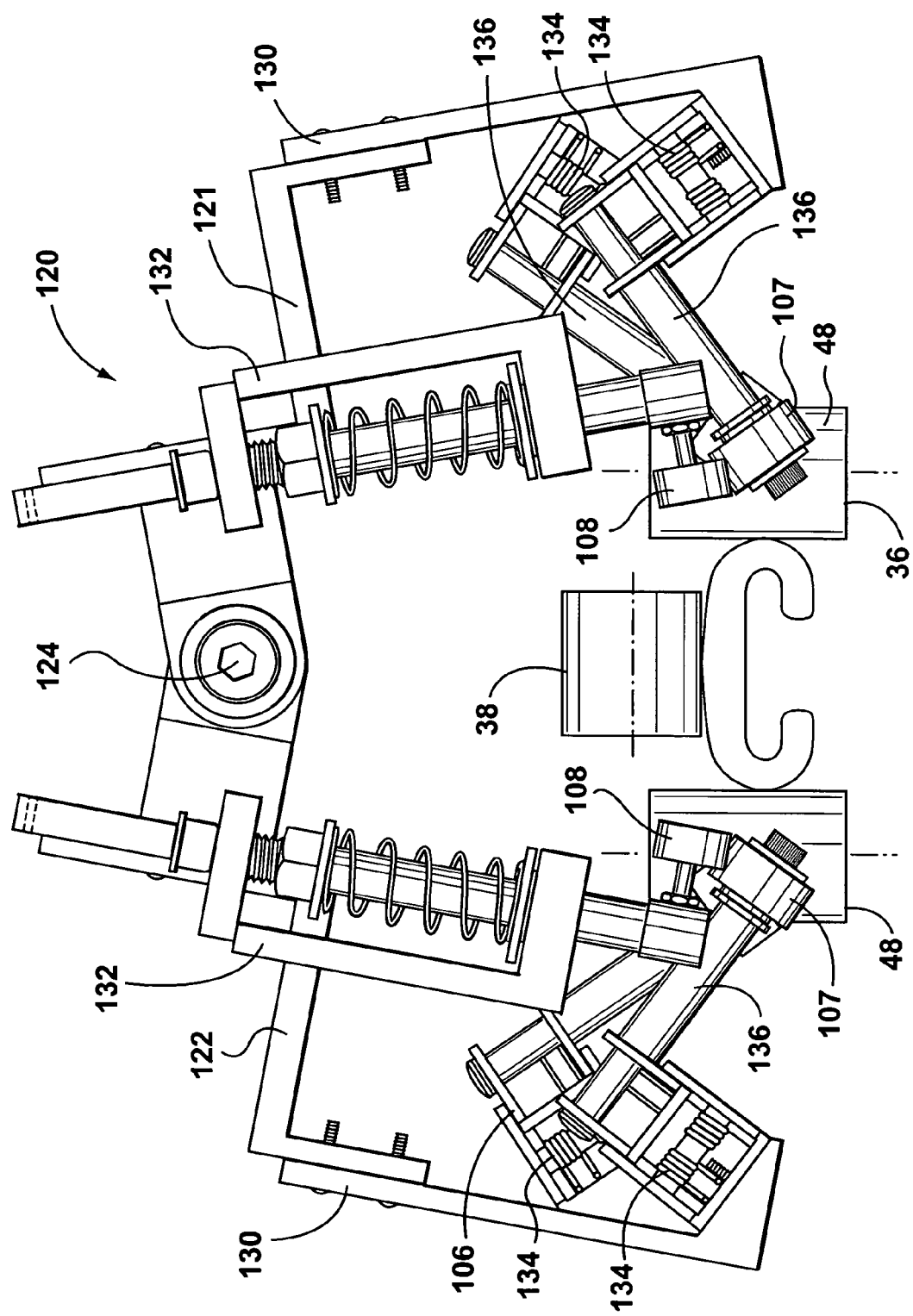
FIGS. 6 and 6a show open and closed positions of a roller extension device.
Figure 6A:
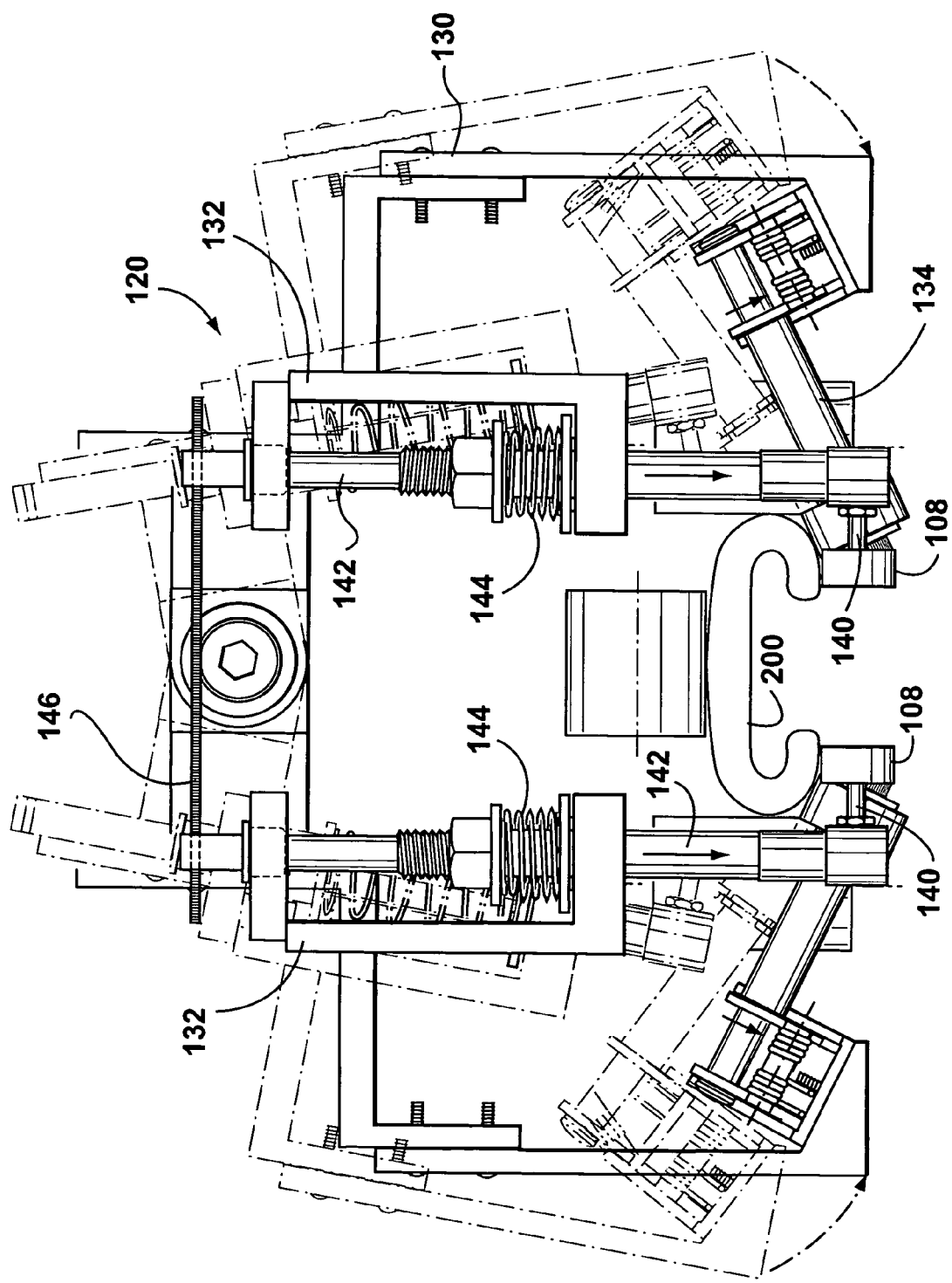
Figure 6B:
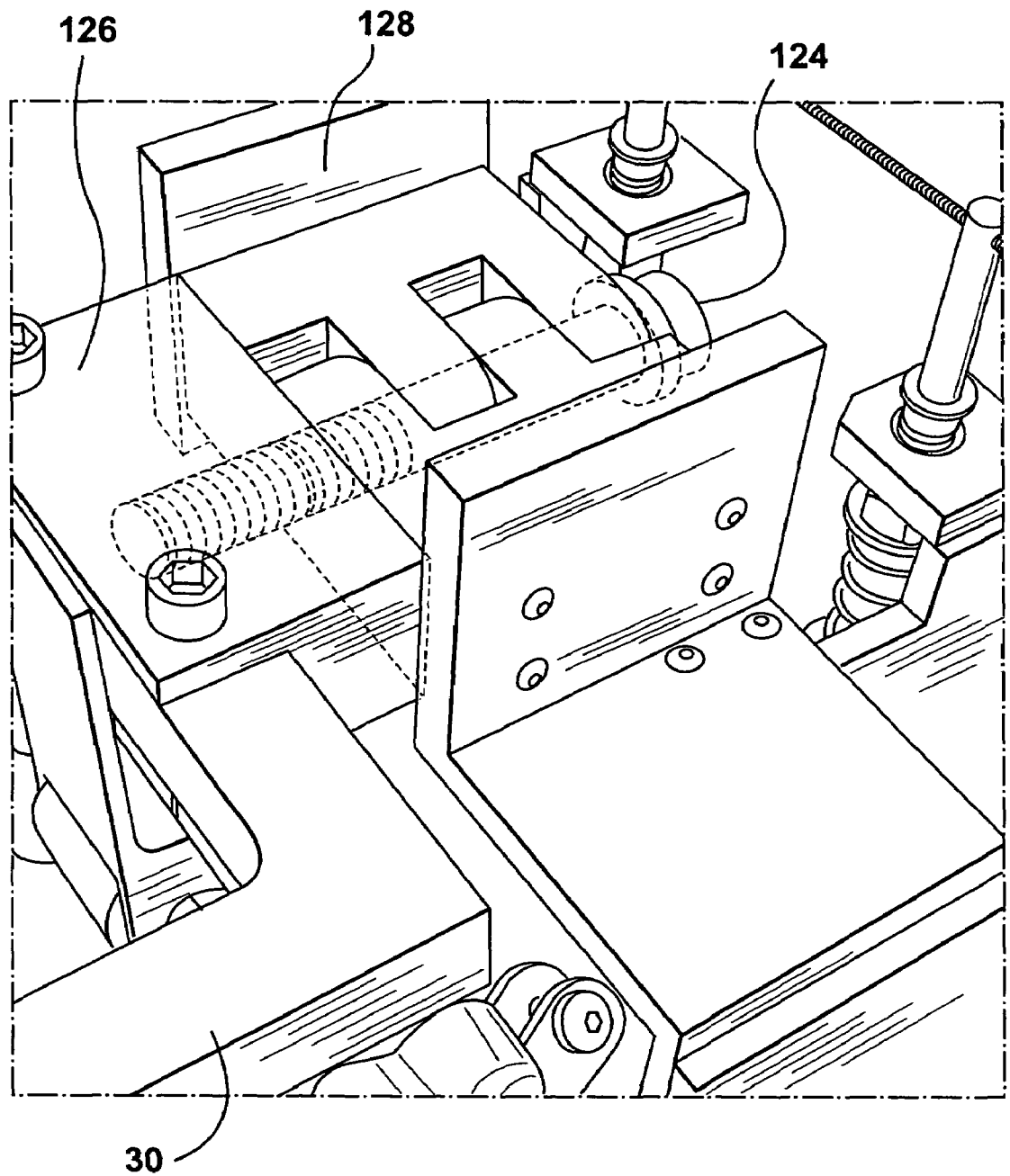
FIG. 6b shows a perspective detailed view of the mounting of the roller extension device to the trough-shaped element.

With reference mainly to FIGS. 6, 6a and 6b, the roller extension device includes first and second parts 121, 122, which are essentially mirror images of one another. The parts 121, 122 are pivotally connected and mounted by a common mounting bolt 124, that engages a mounting bracket 126 attached to the main frame 30 (FIG. 6b).

The two parts 121, 122 each include side flanges 128. During initial mounting, the bolt 124 allows a certain amount of play or axial movement for the parts 121, 122, so that they can be rotated freely. As indicated in FIG. 6*a*, this enables them to be moved from an open position (dotted lines), to a fully closed position (solid lines in FIG. 6*a*), fully engaged around the handrail 200. Once fully engaged, the mounting bolt 124 can be fully tightened, which also causes the side flanges 128 to engage side faces of the mounting bracket 126, so as to squarely align the two parts 121, 122 and to retain them in their correct positions.

Each of the first and second parts 121, 122 includes a first arm 130 carrying two roller pairs 106, 107. Second arms 132 are provided for a final roller pair 108.

The roller pairs 106, 107 include short arms and spring mechanisms 134, generally similar to the spring mechanism 110 for the other roller pairs. However, as each of the rollers 106, 107 is intended to engage, at least to some extent a bottom surface of the handrail 200, they are provided with extension shafts 136.

Referring to FIG. 6*a*, the final roller pair 108 is mounted on the second arms 132. The rollers 108 are mounted on short shafts 140, that are secured to vertically extending rods 142. The rods 142 are mounted for sliding movement in the second arms 132 and coil springs 144 are provided biasing the rods 142 upwards, so as to press the rollers 108 against the bottom surface of lips of the handrail 200.

As shown, upper ends of the rods 142 are provided with small transverse bores in which a tie rod 146 is inserted, after the first and second parts 121, 122 have been secured in position. This tie rod 146 generally ensures that the rods 142 move together in the vertical direction, and also ensure that the rollers 108 are properly aligned under the handrail 200, i.e. the rods 142 do not rotate on their axes to misalign the rollers 108.

All the various rollers can be provided with surfaces adapted for their particular functions. For example, the vertical and side rollers 38, 48 can all be relatively firm or hard, to provide a good guiding and centering action; the pressure roller 86 and rollers 101-107 can all be provided with a resilient cover; for the rollers 106, these can be smaller with a firmer surface. The tension roller can have a cover formed from a spongy or porous resilient material that provides a high coefficient of friction for the film 160. The rollers can be covered with, for example, a polyurethane material or silicone material.

Figure 9:
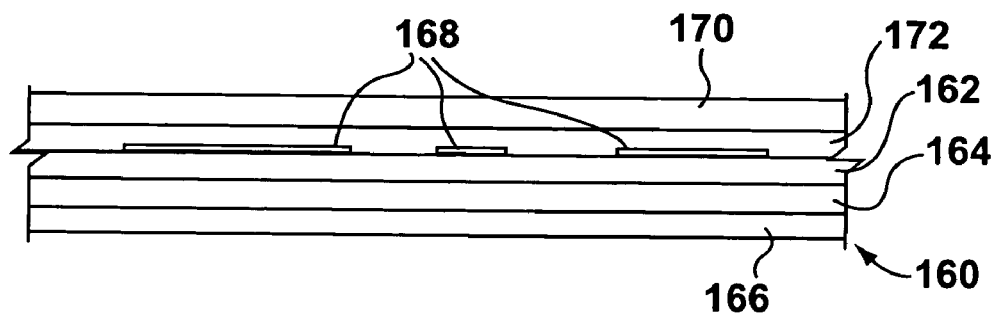
FIG. 9 shows a cross-section through an exemplary film structure.

Referring first to FIG. 9, there is shown, schematically, a cross-section of a film for use with the present invention, which film is the subject of earlier U.S. Pat. No. 6,682,806 and related applications. This cross-section is shown transverse to the longitudinal direction of the handrail. This film is indicated at 160 and comprises a first film layer 162 with a first adhesive layer 164 on the underside thereof. To protect the film until this is applied and to enable the film to be wound up onto a sleeve 150, a release sheet 166 is provided in known manner.

On top of the first layer 162, printed matter is provided as indicated at 168. This printed matter can be text, logos, images, etc., and it is expected that it will often comprise a repeated pattern. Shown schematically, this printed matter would have a negligible thickness, so as not to significantly affect the thicknesses of other layers. This printed matter 168 is printed directly onto the top of the first film layer 162.

Following application of printed matter 168, a second film layer 170 with a respective second layer of adhesive 172 is applied to the top of the first sheet, so as to sandwich the printed matter 168 between the two film layers 162, 170. This serves to protect the printed matter.

Each film layer 162, 170 is preferably a high gloss, clear flexible film, coated with a clear acrylic pressure sensitive adhesive. These films are provided with a release liner. Thus, once the top of the first film layer 162 has been printed, the second film layer 170 with its associated adhesive 172, after the release liner or sheet removed, is then applied to the top of the first film layer 162 to form the combined film 160 shown in FIG. 9.

The width of the film presently supplied is commonly 13 inches. For the present purposes, it would be cut to a desire width depending upon the particular handrail application.

While it is expected that the first and second film layers 162, 170 would both be clear, for some applications, it may be desirable to colour the first film layer 162. Thus, the first layer 162 could be a solid, uniform colour to provide a suitable background to advertising material or a manufacturer's logo, and this colour could be a colour associated with the particular product or manufacturer. Additionally, the second film layer 170, if desired, could be provided with some tinting.

Another aspect of the invention is the use of a film simply to protect a handrail for an escalator or moving walkway. For this purpose, the film 160 could have a single layer. For such an application, the second film layer 170 and its adhesive 172 could be omitted. For completeness, it is noted that, conceivably, in such applications, some printed material could still be provided on the top of the first film layer 162, but such printed matter would not then be protected, and would likely be subject to excessive wear, marking, etc. during passage through the handrail drive mechanism.

The film could also just have a solid colour, optionally with a motion indicator, so as to serve as a quick way to rejuvenate a handrail.

Otherwise, the film used in the present invention can be as described in the above-mentioned U.S. Pat. No. 6,450, 228, and as claimed in related applications. The film is indicated at 160 and comprises a first layer with a first adhesive layer on the underside thereof. The film 160 can be formed of polyurethane with a thickness in the range of approximately 0.5 to 3.0 mil, provided with a layer of adhesive with a thickness in the range of approximately 0.25 to 1 mil. To protect the film until this is applied and to enable the film to be wound up onto a sleeve, a release sheet 166 is provided in known manner.

The following film thicknesses have been found to be practical: a first film that has a thickness of 2 mils and a solid colour; and a second film that is clear and a thickness of 3 mils. Thicknesses may be reduced or varied to minimize vandalism. Also, for some applications, films with a matt finish may be preferred.

The following table sets out preferred propertied for the film. As indicated, the film can be a polyurethane material, but more generally, it is expected that a number of different thermoplastic elastomers could be used.

TABLE 1

| Material: | Thermoplastic Elastomer |
|---|---|
| Shore Hardness(ASTM D-792): | 85A ± 3 |
| Tensile Strength (ASTM D-412): | 36–40 MPa |
| Strss/Strain Properties (ASTM D412/D-638) | |
| Tensile Stresses@10% Strain: | 4–4.5 MPa. |
| Tensile Stresses@50% Strain: | 6.5–7.5 MPa. |
| Tensile Stresses@100% Strain: | 10.0–11.5 MPa. |
| Ultimate Elongation(ASTM D412): | 400% |

TABLE 1-continued

| Material: | Thermoplastic Elastomer |
| --- | --- |
| Compression Set (ASTM D395): | |
| 22 hrs@23° C. | 20% |
| 22 hrs@70° C. | 65% |
| Abrasion loss (DIN 53.516): | 15–20 mm |

As detailed below, the present invention provides pre-stretching of the film in one direction, typically of the order of six percent, i.e. a strain would be applied in the longitudinal direction of the film of the order of six percent. The exact degree of strain will vary depending upon the film, application, handrail configuration, etc. Nonetheless, it is now realized that such a strain must, necessarily, correspondingly elongate an image applied to the film. For many images or patterns, this small percentage of elongation in one direction will not have any significant effect and can possibly be overlooked. For other images, to ensure that the image has desired proportions on the film after application, the image would be, correspondingly, shrunk or reduced in the axial direction, so that its length is approximately 94.33 percent of the original length; then, when extended by six percent, it will be returned to its original, intended length.

The axial stretching should have little or no effect on the transverse dimension of an image, although it is known that elongation in one direction can cause a reduction in the corresponding perpendicular dimension, and this can be compensated for where it occurs.

A description will now be given of the use of the apparatus of the present invention. Firstly, before a film is applied to a handrail, the handrail must be properly prepared. Most handrails, after a period of use, will acquire a film of dirt and grease, preventing proper adherence of an adhesive film. If a previous film has to be removed first, reference should be made to earlier U.S. Pat. No. 6,450,228 and related applications that provide a technique for removing an existing film.

Accordingly, the handrail is first washed with a suitable solvent, to remove all dirt and grease. The handrail is then inspected for gouges or defects that impede application. If deep gouges are present, the handrail may need to be replaced before the film is applied.

For an escalator or moving walkway, an operator is provided with two matched rolls of film, one for each handrail; the handrail is indicated at 200 and its balustrade at 198 in the drawings, while one roll of film is indicated at 174.

Figure 2:
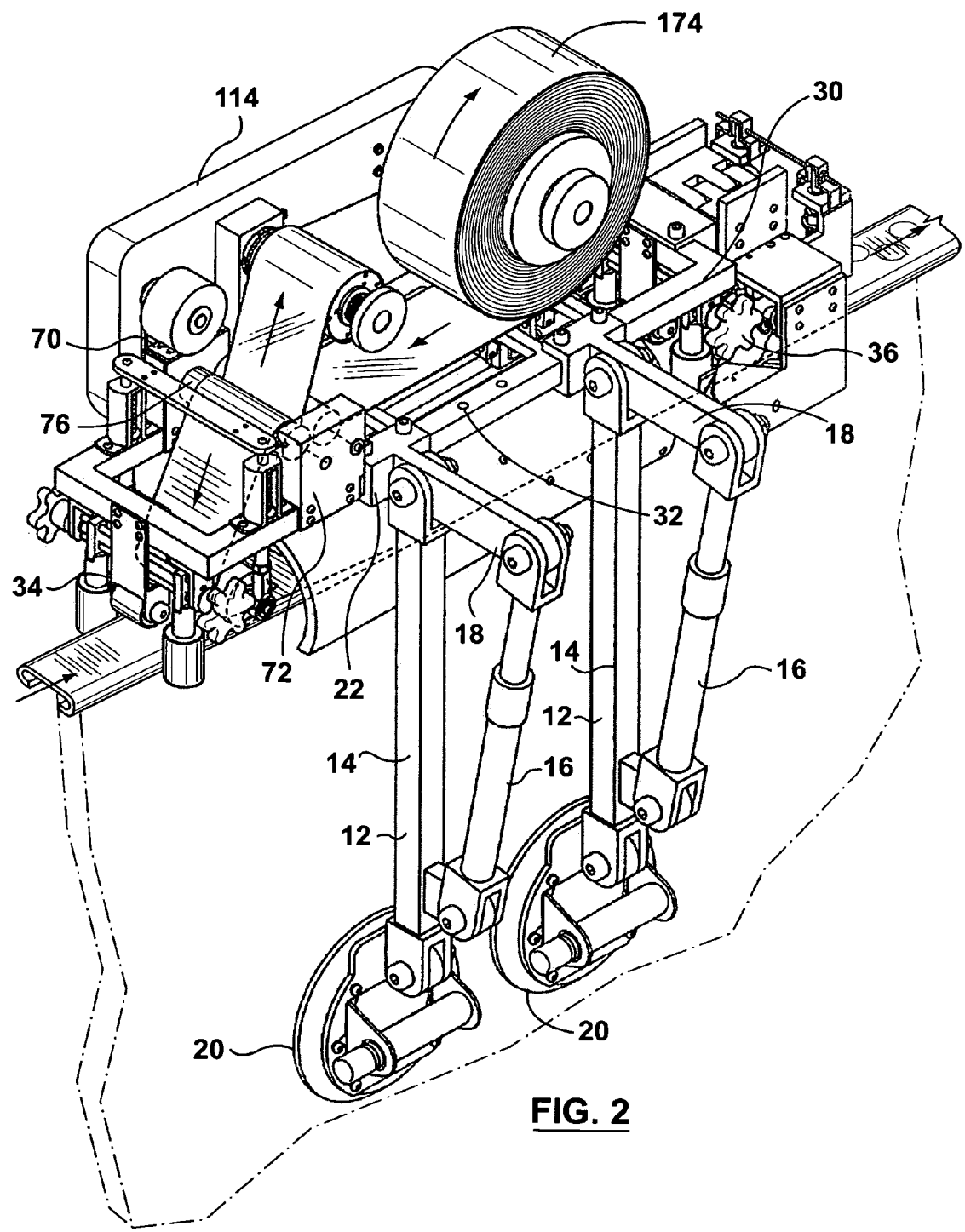
FIG. 2 is a perspective view showing the apparatus, balustrade and handrail of FIG. 1 in greater detail.

The apparatus 10 is mounted to the balustrade 198, shown in FIGS. 1 and 2 preferably mounted at the top of the escalator for down escalator units and at the bottom of the escalator for up escalator units. On installations where obstacles prevent mounting at these locations, it is permissible to attach the apparatus 10 away from the ends on a straight, sloped portion of the handrail.

Initially, the support arms 12 are assembled, and for transportation they may be separated into individual components. The lip roller assembly 120, comprising the two parts 121, 122 is assembled, and readied for attachment to the main frame 30.

During initial mounting, the pressure roller 86 is raised, so that the spring action on the pressure roller does not disrupt proper location of the apparatus 10. For this purpose, the transverse member 88 can be lifted and collars or the like inserted between it and the guides 82, to retain the pressure roller 86 in a raised position. Then, the side rollers 48 of each of the roller devices 34, 36 are displaced outwardly sufficiently to give adequate clearance around the handrail 198. The two shell halves 92a, b of the shell or trough shaped element 92 are opened, by gripping the handles 98.

While gripping the handles 98, the main frame 30 is then lowered on top of the handrail 198. The two halves 92a, b of the trough-shaped element 92 are then closed by releasing the handles 98 and engaging the locking elements 100, and during this operation, the location of the various rollers 101-105 is monitored to ensure that they contact the handrail properly and evenly.

By this time, the ends of the frame 30 are supported on the handrail 200 by the rollers 38. The knobs 52, at either end, are actuated, to displace the side rollers 48 inwards, until they contact the handrail 200, to accurately locate and center the apparatus 10 with respect to the handrail 200.

The suction cups 20 are then adhered to the balustrade 198, and if necessary, the adjustable arm portions 16 are adjusted in length as required, to ensure proper location of the suction cups 20 consistent with the desired location of the main frame 30. The motor or braking device 78 is connected to a suitable power source (not required for a passive braking device 788).

The roller extension device 120 is then attached to the main frame 30 by means of the mounting bolt 124. The two parts 121, 122 are then closed around the handrail 200, and the bolt 124 tightened to secure the parts 121, 122 in the closed position. Operation of its rollers can be inspected at this time. If desired, the rollers can be swung away from the handrail, to simplify closing of the device 120, and then subsequently rotated into position.

At this time, if desired, the handrail 200 can be run for a short period, to ensure that all of the rollers 101-108 for pressing the film onto the handrail are in a proper position and functioning as desired. Since the two halves of the shell-shaped or trough-shaped element 92 are transparent, the various rollers can be viewed for this purpose, and the open configuration of the roller extension device 120 enables the rollers therein to be inspected.

A roll 174 of film 160 on the sleeve 150 is then mounted on the spindle 62, and a take up roll 178 for taking up the release sheet is mounted on the second spindle 66.

The end of the film 160 is unrolled from the first roll, the end of the release sheet 166 is separated from the film and wrapped around the take up roll 178. The end of the film, indicated at 176, is passed around the tension roller 76 and beneath the pressure roller 86, and then adhered to the top of the handrail 200. The side edges of the film end are manually wrapped around the handrail at the start.

The handrail 200 is then moved or jogged for a short distance, so that the film starts to pass through the entire mechanism, and the rollers and the pressure roller mechanism 90 wrap the film 160 around the handrail 200.

Once it has been confirmed that the film is being properly applied to the handrail, i.e. that the handrail is being properly wrapped around the handrail, that the edges of the film are aligned as desired with the slot in the handrail on the underneath of the handrail, and that there are no undesired creases, wrinkles, bubbles, etc., then the apparatus is ready to cover the entire handrail with the film.

Before running the film along the entire length of the handrail, the tension in the film can be checked. Preferably, this is done by running a short length of the film, and measuring the film on the handrail to check the degree of stretch or strain imposed on the film. It is anticipated that most films will have some standard, repeated pattern, so that the length between prominent features of the image or print on the film will be known from the unstretched film on the release sheet, or this can be measured in advance. Then, once a short length of the film has been applied to the handrail, the corresponding measurement can be checked, to ensure that a desired degree of strain or stretch has been applied to the film. The exact degree of stretch or strain has been found to be dependent upon a number of factors, such as characteristics of the individual handrail, installations, temperature, and, possibly, humidity. Accordingly, in practice it may well be necessary to adjust the torque applied by the braking device or motor 78.

If an initial run of the film has the incorrect tension, then it can be removed, and the tension adjusted. Once the film has been applied with the tension or strain within desired limits, then the handrail 200 can be run to apply the film along the entire length of the handrail. When one handrail has been covered, then the other handrail can be subject to the same treatment.

Typically, the escalator is jogged or run three metres to run a test strip, during which it is ensured that the film edges do not get folded in the rollers 101-108. The film is checked for alignment, presence of any bubbles or wrinkles, or other defects. The location of the roll of film 174 on the spindle 60 can be adjusted, to center the film and the pressure applied by the pressure roller 86 can be adjusted if necessary.

The stretch of the film is calculated by remeasuring a repeat length on the film. If the original, unstretched length of a repeated image is X and if it is Y when stretched, the stretch is calculated as:

stretch percent=$((Y-X)/X) \times 100$

Typically, the desired stretch will be about 6 percent. If the stretch is too low, then a controller setting for the motor or braking device 78 is increased; correspondingly, if the stretch is too high, then the setting is turned down.

The following table 2 gives exemplary settings for the braking device 78, which shows that the required tension force, to give a constant six percent stretch or strain, can vary considerably.

TABLE 2

Braking Device 78: Setting, 6% Stretch

| Temperature, C. | Film Width mm | | |
|---|---|---|---|
| | 135 | 142 | 152 |
| 0 | 50 | 55 | 61 |
| 5 | 38 | 42 | 46 |
| 10 | 25 | 28 | 30 |
| 15 | 16 | 18 | 19 |
| 20 | 10 | 11 | 12 |
| 25 | 7 | 8 | 8 |
| 30 | 6 | 7 | 7 |

The handrail 200 is then jogged or run for another two or three metres, to test its stretch. Again, the measurement or calculation above is repeated to determine the stretch. This is repeated as many times as necessary, until the desired degree of stretch is obtained.

Figure 10A:
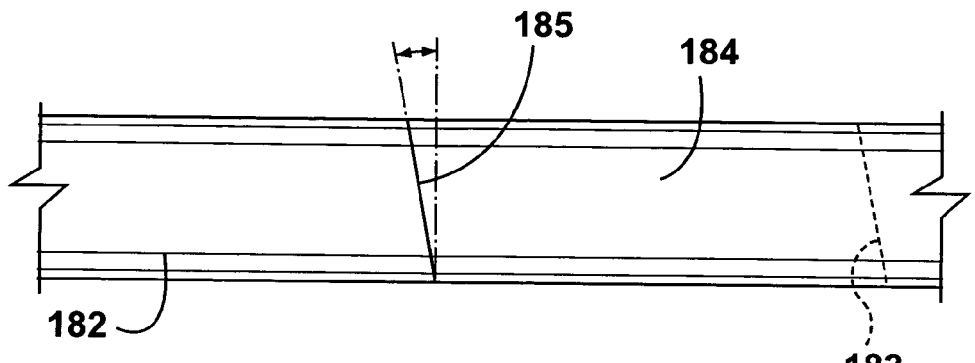
FIGS. 10a, 10b and 10c show, respectively, a planar view of a splice joint, application of a film cap, and bonding of the film cap with an iron to ends of the film.

Once the desired stretch is present, the test sections of the film are pulled up and removed, and the end of the film is trimmed neatly at an angle of 80-85 degrees relative to the longitudinal axis of the handrail 200, using a pair of scissors or a knife, taking care not to damage or nick the handrail itself. This leaves a first film end portion 182 with the actual inclined film end and indicated at 183 (dotted lines in FIG. 10*a*).

Figure 8A:
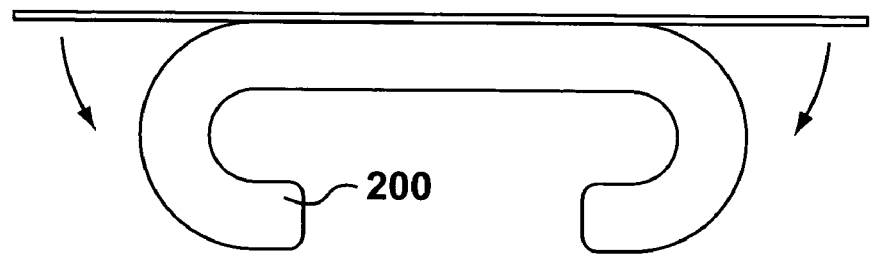
FIGS. 8a and 8b showing schematically wrapping of a film around a handrail.

As shown in FIG. 8*a*, the film 160 is initially planar and flat when it contacts the handrail 200, under the influence of the pressure roller 86. The tension mechanism described above is such as to provide a desired strain or prestretch to the film. Typically, this will be of the order of 6 percent, and more generally is expected to be in the range of 5-8 percent, measured as a percent strain in the film.

Figure 8B:
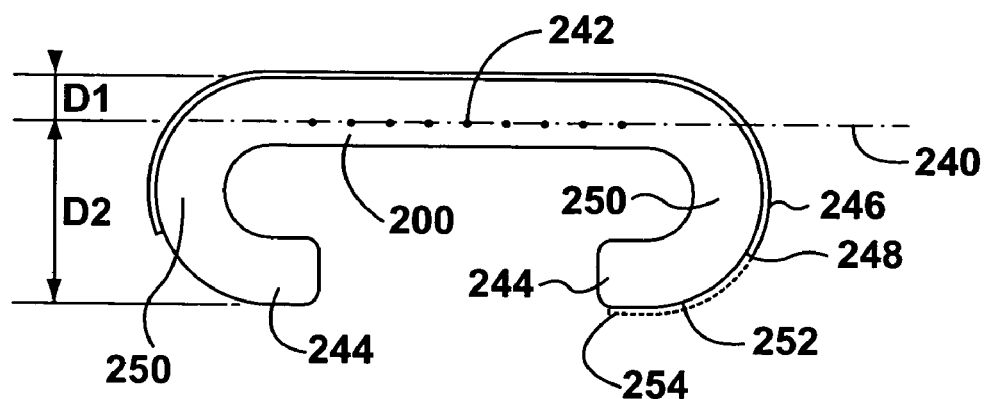

As the film 160 is drawn further along the handrail 200, the rollers 101-108 cause the film to progressively wrap around the handrail until the film is completely in contact with the handrail 200, as shown in FIG. 8*b*.

Figure 10B:
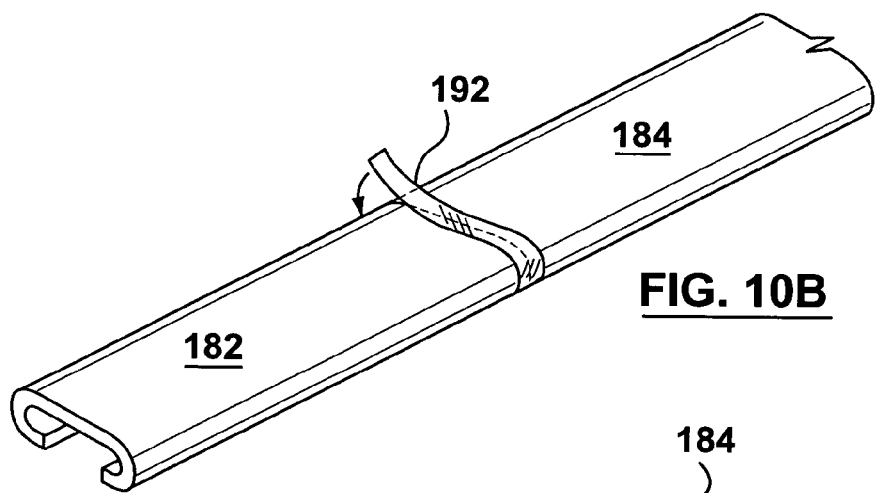
Figure 10C:
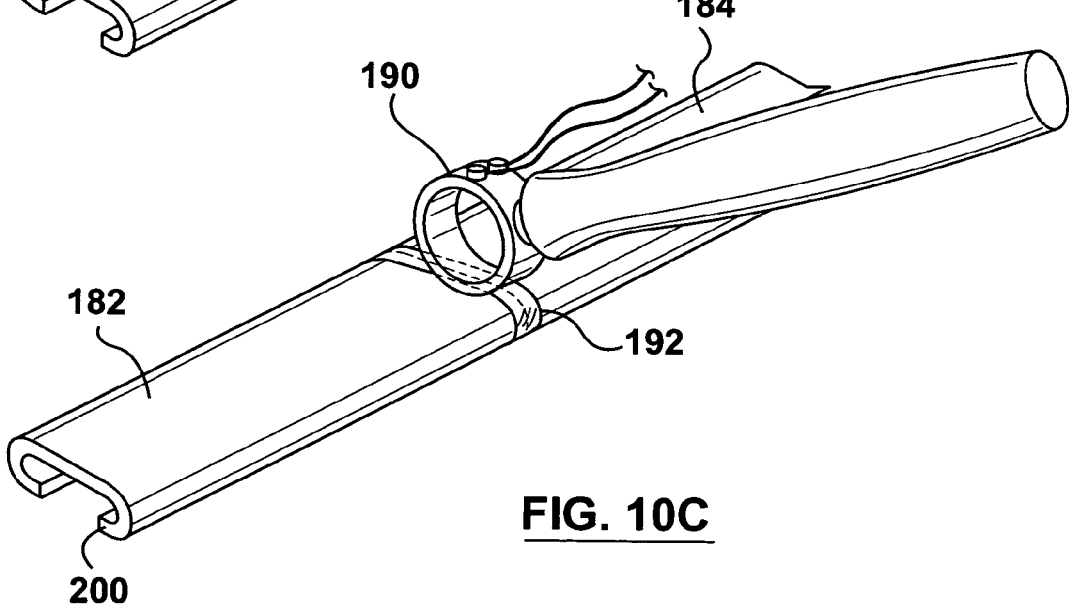

The film is then ready to be applied to the entire handrail. The escalator or moving walkway start button is engaged for one complete handrail revolution and stopped when the film has overlapped the first film end portion 182 by approximately 1.5 to 2 metres (FIG. 10 not showing the full overlap). The film is then cut, and the escalator or moving walkway is then jogged or run sufficiently to run the film end out of the applicator 10.

The applicator 10 can then be taken down or removed. First, the roller extension device 120 is detached from the main frame 30 and removed. The support arms 12 and the suction cups 20 are removed. The side rollers 48 are loosened. The locking mechanism 100 for the shell halves 92*a*, 92*b* is opened. The shell halves 92*a*, 92*b* are held open with handles 98 and the applicator 10 is removed from the balustrade 198. It is then either transferred to the other handrail if this still needs to be provided with a film, or simply put down ready for complete disassembly and packing for transportation. When necessary, any black residue left by suction cups 20 is removed from the balustrade 198.

Then, as a further aspect of the present invention, a heat seal splice is formed for the two end portions of the handrail. After the final cut is made to the film, a second film end portion 184 is formed having an actual film end or edge 185 (FIG. 10).

The second film end portion 184 is formed by pulling up an appropriate amount of excess film, at the overlap portion of the film, until the print or pattern on the overlapped sections of the film matches suitably, or any mismatch is not too discernible. The end of the upper portion of the film is trimmed at an angle of 80-85 degrees to the axis of the handrail 200, to form the film end 185 of the second film end portion 184. The end portion 184 is then smoothed down by hand to ensure that there are no bubbles or wrinkles.

Now, as the film has been subject to prestretching, it has been found that the adhesive securing it to the handrail 200 is inadequate to prevent creep of the film. Within a short time, tension in the film will cause the end portions 182, 184 to commence creeping apart.

A heat seal sealing iron 190 is used as shown in FIG. 10. A film cap is provided, as indicated at 192. The film cap 192 is generally rectangular and has its own release sheet. The film cap 192 is formed from—the same material as the film 160 itself and preferably has the same thickness as one layer of the film 160, although it could have a different thickness. The film cap 192 is transparent. For example, the film cap 192 can have a thickness in the range 0.5-3.0 mils and a width in the range 10-25 mm.

The liner or release sheet for the film cap 192 is removed, and it is placed symmetrically over the overlapping film end portions 182, 184. In other words, it is aligned so that the exposed, upper film end 185 bisects the film cap 192.

It is smoothed down evenly, to ensure that again there are no wrinkles or bubbles.

The heat sealing iron 190 is then pressed against the film cap 192, starting at the center and working towards the sides. It is worked slowly and evenly, with even pressure, to heat seal the film cap 192 to the film end portions 182, 184, i.e. to cause the film cap 192 to fuse or bond to the top of the film 160.

It has been found desirable to provide the iron 190 with a non-stick surface, such as a Teflon surface, to ensure it does not stick to the film. A Teflon surface used has a surface pattern or texture that can leave an impression on the film cap 192, but this has the advantage of confirming that the film cap 192 has been properly heat sealed or bonded to the film 160. Bonding of the film cap 192 can be checked by visual inspection and by the operator using his or her fingers to pick at the edges of the cap 192.

Finally, any excess length of the film cap 192, at the edges of the lips of the handrail 200 is trimmed with a pair of scissors.

A final inspection is then made of the film around entire length of the handrail. Despite all due care, bubbles may occasionally occur. These can be removed by puncturing the bubbles with a hypodermic needle and progressively squeezing the bubbles to squeeze the air out of the bubbles and cause the entire film to adhere to the surface of the handrail. For larger bubbles, a number of punctures may need to be made with a needle.

Now, as mentioned above, the difficulty with providing a flexible film for a handrail is that the handrail 200 is flexed in use. FIG. 8B indicates at 240 the neutral axis of the handrail, defined by tension elements indicated schematically at 242, these usually being a series of coplanar steel cables. As further indicated in FIG. 8b, this results in the top surface of the handrail 200 being spaced a distance D1 above the neutral axis 240, while the bottom of the lips, indicated at 244, are located a distance D2 below the neutral axis 240. In other words, as these steel cables have a much higher modulus of elasticity than the rest of the body of the handrail, typically made of resilient elastomeric material, it is almost solely the characteristics of the stretch inhibiting steel cables 242, which define the location of the neutral axis. The depth D2 is much greater than the depth D1.

As indicated at 246, in applicant's earlier application, it was proposed to wrap the film 160 only partially around the lips to the location approximately indicated at 246, i.e. slightly below the widest point of the handrail indicated by a line 248, representing the middle of shoulders 250 of the handrail. Even so, at such a location, the edges 246 of the film 160 are substantially below the neutral axis 240. Consequently, when the handrail 200 passes around rollers, for example, at the ends of the escalator, the handrail body below the neutral axis 240 is compressed, while the handrail body above the neutral axis 240 is stretched. For the film 160, stretching causes no difficulty. Firstly, the degree of stretching is relatively small, since it is noted the top surface is only a relatively small distance D1 from the neutral axis. Secondly, the film is capable of withstanding the necessary degree of stretching and such stretching does not tend to lift the film from the handrail.

A difficulty occurs for the edge portions of the film, extending down to the edges 246. The edges 246 themselves are well below the neutral axis 240, and as such must compress to a significant extent, if they are to remain adhered to the handrail 200. In practice, it has been found that the edges 246, after repeated use, tend to show a wrinkling or puckering effect, i.e. the edges 246 tend to show short portions that remain adhered to the handrail 200 alternating with short portions that have wrinkled away from the handrail 200, to accommodate the compression of the handrail below the neutral axis 240.

Accordingly, the present invention provides a prestretching of film 160, so that the degree of prestretch, measured as a strain or percentage elongation of the film 160, is at least greater than the maximum degree of compressive reduction in length of the film, i.e. negative elongation, that could occur in use. This will than ensure that, all portions of the film 160, even when the handrail 200 is flexed, will always be maintained in tension. The handrail body itself 200, particularly towards the lips 244 may be subjected to significant compressive strains, but the net strain in the film 160 will always be a tensile strain. Consequently, there should be no tendency for the film 160 to lift from the handrail body 200.

While such prestretching of the film will increase the total tensile load applied to the top portion of the film on top of the handrail 200, as this is only the relatively short distance D1 from the neutral axis, the total tensile strain applied to the film 160 should still be acceptable. For certain handrail designs, configurations and selection of materials for film 160, this may result in excessive tensile loads being applied to the film 160. In such cases, it may be possible to reduce the prestretch applied to the film 160, so that, for the edges of the film 160, small, compressive strains may be applied. These should be selected to be so small that they can be readily borne by the adhesive used to adhere the film 160 to handrail 200 without causing any significant wrinkling or puckering to occur.

In the earlier invention, as indicated at 246, the edges of the film 160 were located relatively high up the body of the handrail 200, with the intention of not imposing excessive compressive strains on the film 160. For the present invention, as these compressive strains are either totally eliminated or at least reduced to acceptable levels, it is now envisaged that the film 160 could extend around to locations such as those indicated at 252 or 254. Edges 252 are located further around the lips 244, while edges 254 anticipate the film 160 extending almost to the end of the lips 244. This is desirable, since edges that are located well under the main body of the handrail will not be visible or apparent to users. Edges that are in any way either visible, or detectable by feel when the user grips the handrail with a hand, encourage those users that have a tendency to pick at these edges. In time and with repeated usage, the edges then become damaged, resulting in the possibility of the film 160 becoming detached to a greater or lesser extent, and a possibility of the film or part of the film being caught up in the handrail drive mechanism.

In particular, the degree to which the film 160 wraps around the handrail can be adjusted and will depend on individual handrail profiles and installations. Having the film wrap a large way around the handrail lips is advantageous as it puts the edge of the film well away from users and not readily accessible to anyone who, for whatever reason, might want to try and peel it off. On the other hand, where the film wraps all the way around the lips, it can tend to buckle as the handrail travels around end rollers and the like. Accordingly, it is expected that some compromise will usually be needed between these two parameters.

The invention claimed is:

1. In combination, an elongate handrail and a flexible film adhered to the handrail, the film comprising: a first film layer and a first layer of adhesive between the first film layer and the handrail, bonding the first film layer to the handrail, wherein the film has been applied to the handrail in tension, whereby the film includes a desired prestretch, thereby to at least reduce any tendency for edges of the film to separate from the handrail when these edges are subject to compressive strains.

2. A combination of a handrail and a film as claimed in claim 1, wherein the film extends, at least partially, around the outer surfaces of the shoulders of the handrail.

3. A combination of a handrail and a film as claimed in claim 2, which includes printed matter on the first film layer.

4. A combination of a handrail and a film as claimed in claim 3, wherein the film includes a second film layer and a second layer of adhesive bonding the second film layer on top of the first film layer.

5. A combination of a handrail and a film as claimed in claim 4, which includes printed matter, between the first film layer and the second film layer.

6. A combination of a handrail and a film as claimed in claim 3, wherein the printed matter comprises a pattern repeated at regular intervals along the length of the film.

7. A combination as claimed in claim 4, wherein each film layer comprises polyurethane with an approximate thickness in the range of 0.5 to 3 mil and an appropriate adhesive with an approximate thickness in the range of 0.25 to 1 mil.

8. A combination as claimed in claim 2, wherein the film extends around the shoulders of the handrail to the end of the lips of the handrail.

9. A combination of a handrail and a film as claimed in claim 1, wherein the handrail comprises a continuous loop of handrail, intended to be driven in use on an escalator or moving walkway, and wherein the film is generally continuous along the length of the handrail and includes end portions which overlap one another to form a joint.

10. A combination of a handrail and a film as claimed in claim 9, wherein the film extends around the outside of the handrail and at least partially covers the shoulders of the handrail.

11. A combination as claimed in claim 9, wherein the adhesive permits removal of the film, whereby, in use, the elongate handrail can be used with and without the flexible film and the flexible film can be exchanged for another flexible film.

12. A combination as claimed in claim 1, wherein the amount of prestretch applied to the film is in the range of 5 to 8 percent measured as a strain applied to the film.

13. A combination as claimed in claim 12, wherein the amount of prestretch is substantially 6 percent measured as a strain applied to the film.

14. A combination as claimed in claim 9, including a film cap, applied over the top of the overlapped end portions and fused to the end portions, to prevent separation of the end portions by creep.

15. A combination as claimed in claim 14, wherein the film cap comprises a strip of transparent material.

16. A combination as claimed in claim 15, wherein each film layer and the strip of transparent material are formed from thermoplastic elastomer, and each has a thickness of in the range 0.5 to 3 mil.

17. A combination as claimed in claim 16, wherein the ends of the film, and the film cap are all inclined at an angle to the axis of the handrail in the range 80-85°.

18. A method of applying a flexible film to a moving handrail, the method comprising:
   (1) providing a film comprising a first film layer and first layer of adhesive on the underside thereof, the film being generally elongate and having width corresponding to the width of the handrail;
   (2) aligning and adhering a first end of the film to a surface of the handrail;
   (3) applying a substantially constant tension load to the film to provide a desired degree of strain to the film;
   (4) driving the handrail relative to the film, to cause the prestretched film to adhere continuously and progressively to the handrail; and
   (5) ensuring that the full width of the film is uniformly and smoothly adhered to the surface of the handrail.

19. A method as claimed in claim 18, which includes providing a film having a width sufficient to wrap around the shoulders of the handrail, the method including progressively wrapping the film around the shoulders of the handrail by means of a plurality of pairs of rollers, each pair of rollers being mounted successively further apart and around the outside of the handrail.

20. A method as claimed in claim 18, wherein step (3) comprises applying a strain to the film in the range of 5 to 8 percent.

21. A method as claimed in claim 18, including overlapping end portions of the film to form a complete loop of film around the handrail, providing a film cap at the overlapped end portions of the film, and fusing the film cap to the end portions of the film, to prevent creep of the end portions.

22. An apparatus for applying an adhesive film to a moving handrail, the apparatus comprising: mounting means for mounting the apparatus to a balustrade; a first spindle means, for mounting a first roll of film; a tensioning device for applying tension to the film, to apply a desired amount of strain to the film before the film is applied to the handrail; and a pressure means for applying pressure to the film to cause the film to adhere to the handrail, whereby, in use, the handrail can be driven past the apparatus, causing the film to be unrolled from the first roll with the pressure means for causing the film to adhere to the handrail and the tensioning device prestretching the film.

23. An apparatus as claimed in claim 22, which includes a second spindle means, on which a second roll, for taking up a release sheet, is mounted in use and a drive means between the first and second spindle means, whereby unwinding of film from a roll on the first spindle means causes the first spindle means to drive the second spindle means, thereby causing the second spindle means to take up a release sheet separated from film leaving the first roll.

* * * * *